United States Patent
Jang (10) Patent No.: US 7,864,767 B2
(45) Date of Patent: Jan. 4, 2011

(54) PROVIDING BROADCAST CHANNEL INFORMATION

(75) Inventor: Jung-In Jang, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 559 days.

(21) Appl. No.: 11/475,202

(22) Filed: Jun. 27, 2006

(65) Prior Publication Data

US 2007/0076716 A1 Apr. 5, 2007

(30) Foreign Application Priority Data

Sep. 22, 2005 (KR) ...................... 10-2005-0088327

(51) Int. Cl.
*H04L 12/28* (2006.01)
*H04Q 11/00* (2006.01)

(52) U.S. Cl. .......................... 370/390; 370/432; 725/44; 725/97; 725/98; 725/112; 725/116; 725/118; 725/139

(58) Field of Classification Search .................. 370/390, 370/432; 725/44, 91, 93, 97, 98, 105, 112, 725/114, 116, 118, 139
See application file for complete search history.

(56) References Cited

U.S. PATENT DOCUMENTS

| | | | | |
|---|---|---|---|---|
| 5,142,532 A | * | 8/1992 | Adams | 370/432 |
| 5,583,561 A | * | 12/1996 | Baker et al. | 725/93 |
| 5,892,764 A | * | 4/1999 | Riemann et al. | 370/401 |
| 6,381,747 B1 | | 4/2002 | Wonfor | |
| 6,973,667 B2 | * | 12/2005 | Fritsch | 725/88 |
| 7,301,944 B1 | * | 11/2007 | Redmond | 370/390 |
| 7,344,084 B2 | * | 3/2008 | DaCosta | 235/472.01 |
| 2003/0106065 A1 | | 6/2003 | Sakai | |
| 2004/0175121 A1 | * | 9/2004 | Ellis et al. | 386/83 |
| 2004/0177161 A1 | * | 9/2004 | Hoang | 709/246 |
| 2004/0221311 A1 | | 11/2004 | Dow | |
| 2005/0028206 A1 | * | 2/2005 | Cameron et al. | 725/46 |
| 2005/0204391 A1 | * | 9/2005 | Hunleth et al. | 725/78 |
| 2006/0171390 A1 | * | 8/2006 | La Joie | 370/390 |
| 2007/0174471 A1 | * | 7/2007 | Van Rossum | 709/229 |

FOREIGN PATENT DOCUMENTS

GB 2 385 473 8/2003

(Continued)

OTHER PUBLICATIONS

*Decision of Grant* from the Korean Patent Office issued in Applicant's corresponding Korean Patent Application No. 2005-0088327 dated Oct. 24, 2007.
*Search Report* from the European Patent Office issued in Applicant's corresponding European Patent Application No. 06015769.0 dated Jul. 22, 2008.

(Continued)

*Primary Examiner*—Michael J Moore, Jr.
*Assistant Examiner*—Lonnie Sweet
(74) *Attorney, Agent, or Firm*—H.C. Park & Associates, PLC (57) ABSTRACT

A system and method of providing broadcast channel information generates a join message to join a broadcast channel information multicast group, sends the join message to a network, and stores a broadcast channel information table received from the network. Therefore, there is no need to receive broadcast channel information every time a set-top box is turned on or off.

9 Claims, 7 Drawing Sheets

FOREIGN PATENT DOCUMENTS

| | | |
|---|---|---|
| KR | 10-2000-0034252 | 6/2000 |
| KR | 10-2003-0042801 | 6/2003 |
| KR | 10-2003-0057691 | 7/2003 |
| KR | 10-20040045182 | 6/2004 |

OTHER PUBLICATIONS

Summons for EP Patent Application No. 06015769.0 dated Feb. 24, 2010.

* cited by examiner

| CHANNEL NUMBER (16Bits) | CHANNEL DESCRIPTOR (32Bytes) | MULTICAST ADDRESS (32Bits) | MACROVISION FLAG (8Bits) |
|---|---|---|---|
| 1 | MOVIE CHANNEL | 0xE01E1E09 (224.30.30.9) | 0x01 |
| 2 | SPORTS CHANNEL | 0xE01E1Enn (224.30.30.nn) | 0x00 |
| ... | ... | | |
| N | EDUCATION CHANNEL | | 0x01 |

PROVIDING BROADCAST CHANNEL INFORMATION

CLAIM OF PRIORITY

This application makes reference to, incorporates the same herein, and claims all benefits accruing under 35 U.S.C. §119 from an application earlier filed in the Korean Intellectual Property Office on 22 Sep. 2005 and there duly assigned Serial No. 10-2005-0088327.

BACKGROUND OF THE INVENTION

1. Field of the Invention

The present invention relates to a system and method of providing broadcast channel information.

2. Discussion of the Related Art

Internet Protocol Television (IPTV) provides information services, moving picture contents, broadcast programs, and so forth through a television (TV) set using the Internet at high speed.

Since IPTV unites the Internet and TV, it can be called a type of digital convergence. Unlike conventional Internet TV, IPTV uses a TV set instead of a computer monitor and a remote controller instead of a mouse.

IPTV is similar to general cable broadcasting or satellite broadcasting in that it provides broadcast contents including video, but is different in that it has interactivity.

Meanwhile, IPTV service requires a TV set, a set-top box connected to the Internet, a head-end sending broadcast data of IPTV broadcast channels to the set-top box, and a broadcast channel information-providing server providing IPTV broadcast channel information, and so forth.

Transmission of broadcast data of an IPTV broadcast channel from the head-end to the set-top box will now be described.

The set-top box is connected to the broadcast channel information-providing server providing broadcast channel information, and receives and displays broadcast channel information on a screen.

Here, the broadcast channel information can be generated in web page format using hyper text markup language (HTML) and Java script, and includes at least one broadcast channel multicast address that is separately set up for each broadcast channel in order to transmit/receive the broadcast data of an IPTV broadcast channel.

Therefore, the set-top box should provide a web browser to display the broadcast channel information generated in web page format using HTML and Java script on a TV screen.

In other words, the set-top box displays the broadcast channel information generated in web page format using HTML and Java script on the TV screen using a web browser.

Subsequently, when a broadcast channel is selected from the broadcast channel information displayed on the TV screen, the set-top box generates and sends a join message over the Internet in order to join a multicast group set up for the broadcast channel.

In general, the Internet can be configured with at least one network switch (router).

The network switch has broadcast channel multicast addresses that are separately set up to transmit/receive broadcast data of an IPTV broadcast channel, and information of members included in each broadcast channel multicast group.

When the join message for the broadcast channel multicast group is received from the set-top box, the network switch includes the set-top box in the broadcast channel multicast group and multicasts a broadcast data packet received from an IPTV broadcasting station to the members included in the broadcast channel multicast group.

Thereby, the set-top box displays the broadcast data multicast from the network switch on the TV screen.

Meanwhile, the set-top box generates a leave message according to a leave request for a broadcast channel multicast group and sends the leave message to the network switch.

According to the join and leave messages, the network switch manages members that join or leave the broadcast channel multicast group using Internet group management protocol (IGMP).

However, when the set-top box is turned off and then on again, it must again receive broadcast channel information in web page format from the broadcast channel information-providing server so that a broadcast channel can be selected through the web browser.

In addition, when a number of IPTV broadcast channels are included in the broadcast channel information, the amount of the broadcast channel information increases, and thus time taken to receive the broadcast channel information increases.

Furthermore, whenever broadcast channel information changes, its web page format version must be updated, and thus management efficiency decreases.

SUMMARY OF THE INVENTION

It is an object of the present invention to provide a system and method for providing broadcast channel information, wherein a table including information about at least one broadcast channel is provided to and stored in a set-top box so that a desired broadcast channel can be selected.

According to an exemplary embodiment of the present invention, a system of providing broadcast channel information is provided, the system including: a broadcast channel information-providing server including a broadcast channel information table and a broadcast channel information multicast address in a first Internet Protocol (IP) packet, the broadcast channel information-providing server adapted to send the first IP packet to a network, the broadcast channel information multicast address being arranged to transmit/receive the broadcast channel information table; and a set-top box adapted to generate a first join message to join a broadcast channel information multicast group, to send the first join message to the network, to store the broadcast channel information table received from the network, to generate a second join message to join a multicast group for transmitting/receiving broadcast data of a broadcast channel included in the broadcast channel information table according to an access request for the broadcast channel, to send the second join message to the network, and to output the broadcast data of the broadcast channel received from the network.

The broadcast channel information table includes at least one of entries indicating broadcast channel numbers, describing broadcast channels, representing broadcast channel multicast addresses arranged to transmit/receive broadcast data of broadcast channels, and indicating whether or not broadcast data of the broadcast channels can be copied.

The broadcast channel information-providing system further includes: at least one network switch arranged in the network, the at least one network switch adapted to add the set-top box to a list of members joining the broadcast channel information multicast group using an Internet Group Management Protocol (IGMP) according to the first join message sent from the set-top box, to include the broadcast channel information table received from the broadcast channel information-providing server in a second IP packet, and to multicast the second IP packet to the members of the list.

The broadcast channel information-providing server includes: a table generator adapted to generate the broadcast channel information table using information of at least one input broadcast channel, to include the generated broadcast channel information table and the broadcast channel information multicast address arranged to transmit/receive the broadcast channel information table in the first IP packet and to send the first IP packet to the network, and, upon the broadcast channel information table changing, to include the changed broadcast channel information table and the broadcast channel information multicast address in the first IP packet and to send the first IP packet to the network; and a broadcast data provider adapted to include broadcast data and a multicast address in a third IP packet and to send the third IP packet to the network, the broadcast data being received from at least one broadcasting station via the network and the multicast address being arranged to multicast the corresponding broadcast data.

The information of at least one input broadcast channel includes at least one of broadcast channel number data, broadcast channel description data, broadcast channel multicast address data arranged to transmit/receive broadcast data of the broadcast channel, and data as to whether or not the broadcast data of the broadcast channel can be copied.

The set-top box includes: a database adapted to store the broadcast channel information multicast address and the broadcast channel information table; a broadcast channel information table receiver adapted to generate the first join message to join the broadcast channel information multicast group, to send the first join message to the network, to receive the broadcast channel information table and a changed broadcast channel information table from the network, and to store the broadcast channel information table and the changed broadcast channel information table in the database; and a broadcast data receiver adapted to generate the second join message to join the multicast group for transmitting/receiving the broadcast data of the broadcast channel according to the access request for the broadcast channel, to send the second join message to the network, to output the broadcast data of the broadcast channel received from the network, and to regulate copying of the broadcast data of the broadcast channel according to the information as to whether or not the broadcast data of the broadcast channel can be copied included in the broadcast channel information table.

The broadcast data receiver is adapted to generate a third join message to join a multicast group for transmitting/receiving broadcast data of a broadcast channel arranged ahead of the access request for the broadcast channel, to send the third join message to the network, to receive the broadcast data of the set broadcast channel from the network, to output the broadcast data, and to regulate copying of the broadcast data of the set broadcast channel according to the information as to whether or not the broadcast data of the set broadcast channel can be copied included in the broadcast channel information table.

According to another exemplary embodiment of the present invention, a method of providing broadcast channel information in a broadcast network having a broadcast channel information-providing server and at least one set-top box is provided, the method including: including a broadcast channel information table and a broadcast channel information multicast address arranged to transmit/receive the broadcast channel information table in a first Internet Protocol (IP) packet in the broadcast channel information-providing server, and sending the first IP packet to a network with the broadcast channel information-providing server; generating a first join message to join a broadcast channel information multicast group, sending the first join message to the network, and storing the broadcast channel information table received from the network with the at least one set-top box; and generating a second join message to join a multicast group for transmitting/receiving broadcast data of a desired broadcast channel according to an access request for the desired broadcast channel included in the broadcast channel information table, sending the second join message to the network, and outputting the broadcast data of the desired broadcast channel received from the network with the at least one set-top box.

The broadcast channel information table includes at least one of entries indicating broadcast channel numbers, describing broadcast channels, representing broadcast channel multicast addresses arranged to transmit/receive broadcast data of broadcast channels, and indicating whether or not broadcast data of the broadcast channels can be copied.

Including a broadcast channel information table and a broadcast channel information multicast address arranged to transmit/receive the broadcast channel information table in a first Internet Protocol (IP) packet in the broadcast channel information-providing server, and sending the first IP packet to a network includes: generating the broadcast channel information table using information of at least one input broadcast channel, including the generated broadcast channel information table and the broadcast channel information multicast address in the first IP packet, and sending the first IP packet to the network; including a changed broadcast channel information table and the broadcast channel information multicast address in the first IP packet and sending the first IP packet to the network in response to the broadcast channel information table changing; and including broadcast data and a multicast address in a second IP packet, and sending the second IP packet to the network, the broadcast data being received from at least one broadcasting station via the network and the multicast address being arranged to multicast the corresponding broadcast data.

The information of at least one input broadcast channel includes at least one of broadcast channel number data, broadcast channel description data, broadcast channel multicast address data arranged to transmit/receive broadcast data of broadcast channels, and data as to whether or not the broadcast data of broadcast channels can be copied.

Generating a second join message to join a multicast group for transmitting/receiving broadcast data of a desired broadcast channel according to an access request for the desired broadcast channel included in the broadcast channel information table, sending the second join message to the network, and outputting the broadcast data of the desired broadcast channel received from the network includes: regulating copying of the broadcast data of the desired broadcast channel according to the information at to whether or not the broadcast data of the desired broadcast channel can be copied included in the broadcast channel information table.

The method further includes: generating a third join message to join a multicast group for transmitting/receiving broadcast data of a broadcast channel arranged ahead of the access request for the desired broadcast channel, and sending the third join message to the network; and receiving the broadcast data of the set broadcast channel from the network, outputting the broadcast data, and regulating copying of the broadcast data of the set broadcast channel according to the information as to whether or not the broadcast data of the set broadcast channel can be copied included in the broadcast channel information table.

BRIEF DESCRIPTION OF THE DRAWINGS

A more complete appreciation of the present invention and many of the attendant advantages thereof will be readily apparent as the present invention becomes better understood by reference to the following detailed description when considered in conjunction with the accompanying drawings in which like reference symbols indicate the same or similar components, wherein.

DESCRIPTION OF THE INVENTION

Hereinafter, exemplary embodiments of the present invention are described in detail with reference to the accompanying drawings. Matters related to the present invention and well-known in the art have not been described in detail when deemed that such descriptions would detract from the clarity and concision of the disclosure.

Figure 1:
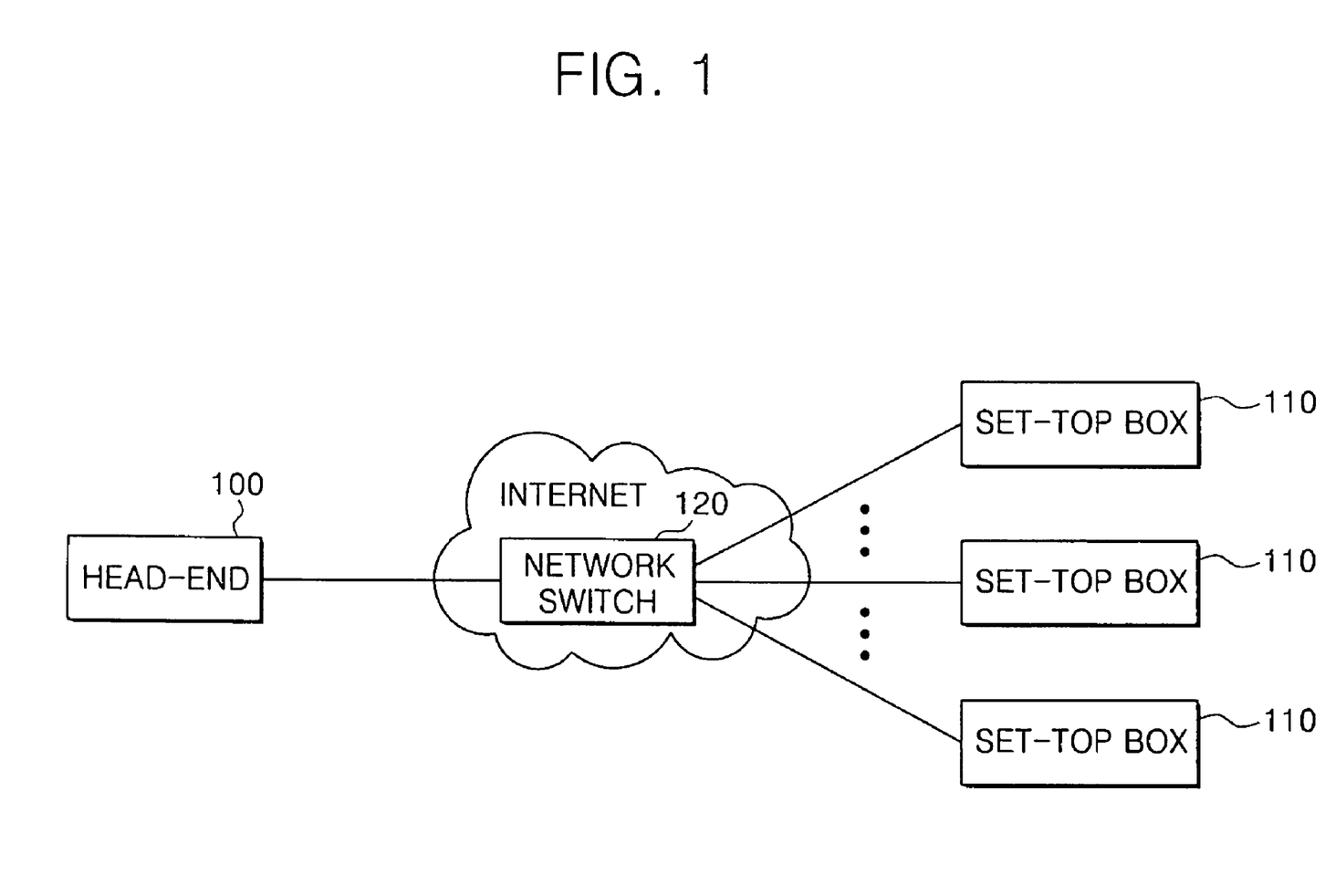
FIG. 1 is a block diagram of a network connection of an Internet Protocol Television (IPTV) broadcast channel information-providing system according to an exemplary embodiment of the present invention.

FIG. 1 is a block diagram of a network connection of an Internet Protocol Television (IPTV) broadcast channel information-providing system according to an exemplary embodiment of the present invention. As shown in FIG. 1, the IPTV broadcast channel information-providing system according to the present invention includes a head-end 100 and at least one set-top box 110. In addition, a network switch 120 connects the Internet, the head-end 100 and the at least one set-top box 110.

Usually, there is more than one network switch. However for convenience only one network switch has been illustrated.

The head-end 100 transforms a broadcast channel information table generated by an Internet broadcast service provider into a Moving Picture Experts Group 2 (MPEG2) Transport Stream (TS), generates a first Internet Protocol (IP) packet including the broadcast channel information table in MPEG2 TS format and a broadcast channel information multicast address, and sends the first IP packet to the network switch 120.

The broadcast channel information table includes IPTV broadcast channel number information, an IPTV broadcast channel description, at least one broadcast channel multicast address set up to transmit/receive the broadcast data of an IPTV broadcast channel, and information as to whether or not the broadcast data of each IPTV broadcast channel can be copied.

The head-end 100 transforms IPTV broadcast data received from at least one IPTV broadcasting station via the Internet into MPEG2 format, generates a second IP packet including the IPTV broadcast data in MPEG2 format and the broadcast channel multicast group address, and sends the second IP packet to the network switch 120.

The network switch 120 has information about a broadcast channel information multicast group set up to transmit/receive broadcast channel information, and manages members that join or leave the broadcast channel information multicast group using Internet Group Management Protocol (IGMP).

The broadcast channel information multicast group information includes the broadcast channel information multicast address set up to transmit/receive broadcast channel information, and a list of members joining the broadcast channel information multicast group.

The network switch 120 includes the broadcast channel information table in MPEG2 TS format included in the first IP packet sent from the head-end 100 in a multicast packet, and sends the multicast packet to the members joining the broadcast channel information multicast group.

Hereinafter, the members joining the broadcast channel information multicast group are considered to be the at least one set-top box 110 of FIG. 1.

The set-top box 110 stores the broadcast channel information table included in the multicast packet sent from the network switch 120 and displays the broadcast channel information table on a TV screen in response to a user's command.

Subsequently, the set-top box 110 generates a first join message to join a multicast group set up for a broadcast channel according to a broadcast channel access request and sends the first join message to the network switch 120.

In addition, when the broadcast channel is directly selected regardless of the broadcast channel information table displayed on the TV screen, e.g., when the broadcast channel number is directly selected through a remote controller, the set-top box 110 extracts the multicast address for the selected broadcast channel from the broadcast channel information table.

The set-top box 110 causes the multicast address for the broadcast channel extracted from the broadcast channel information table to be included in the first join message for joining the multicast group set up for the corresponding broadcast channel and sends the first join message to the network switch 120.

The network switch 120 adds the set-top box 110 to the multicast group set up to transmit/receive the broadcast data of the broadcast channel corresponding to the first join message, according to the first join message.

Subsequently, the network switch 120 receives the broadcast data of the broadcast channel corresponding to the first join message sent from the set-top box 110 and multicasts the broadcast data to the set-top box 110.

When the broadcast channel information table changes, the head-end 100 transforms the changed broadcast channel information table into the MPEG2 TS and sends the first IP packet including the changed broadcast channel information table in MPEG2 TS format and the broadcast channel information multicast address to the network switch 120.

When the first IP packet including the changed broadcast channel information table is received from the head-end 100, the network switch 120 includes the changed broadcast channel information table in the third IP packet and multicasts the third IP packet to the set-top box 110 included in the broadcast channel information multicast group.

When the third IP packet including the changed broadcast channel information table is received from the network switch 120, the set-top box 110 replaces the previously stored broadcast channel information table with the changed broadcast channel information table.

Figure 2:
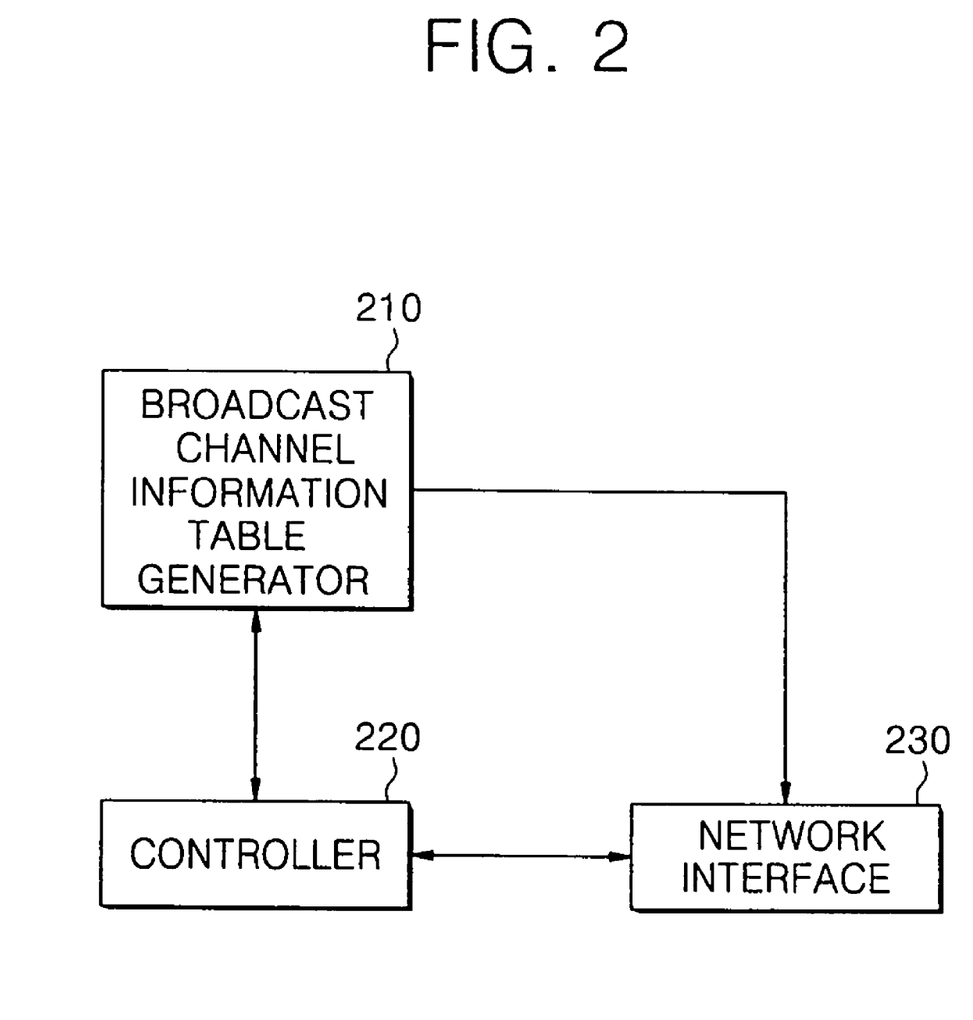
FIG. 2 is a block diagram of the head-end of FIG. 1.

FIG. 2 is a block diagram of the head-end of FIG. 1. As shown in FIG. 2, the head-end includes a broadcast channel information table generator 210, a controller 220, and a network interface 230.

The broadcast channel information table generator 210 generates a broadcast channel information table using broadcast channel information. The broadcast channel information includes IPTV broadcast channel numbers, a description of IPTV broadcast channels, at least one broadcast channel multicast address set up to transmit/receive the broadcast data of an IPTV broadcast channel, and information as to whether or not the broadcast data of the at least one IPTV broadcast channel can be copied.

Figure 7:
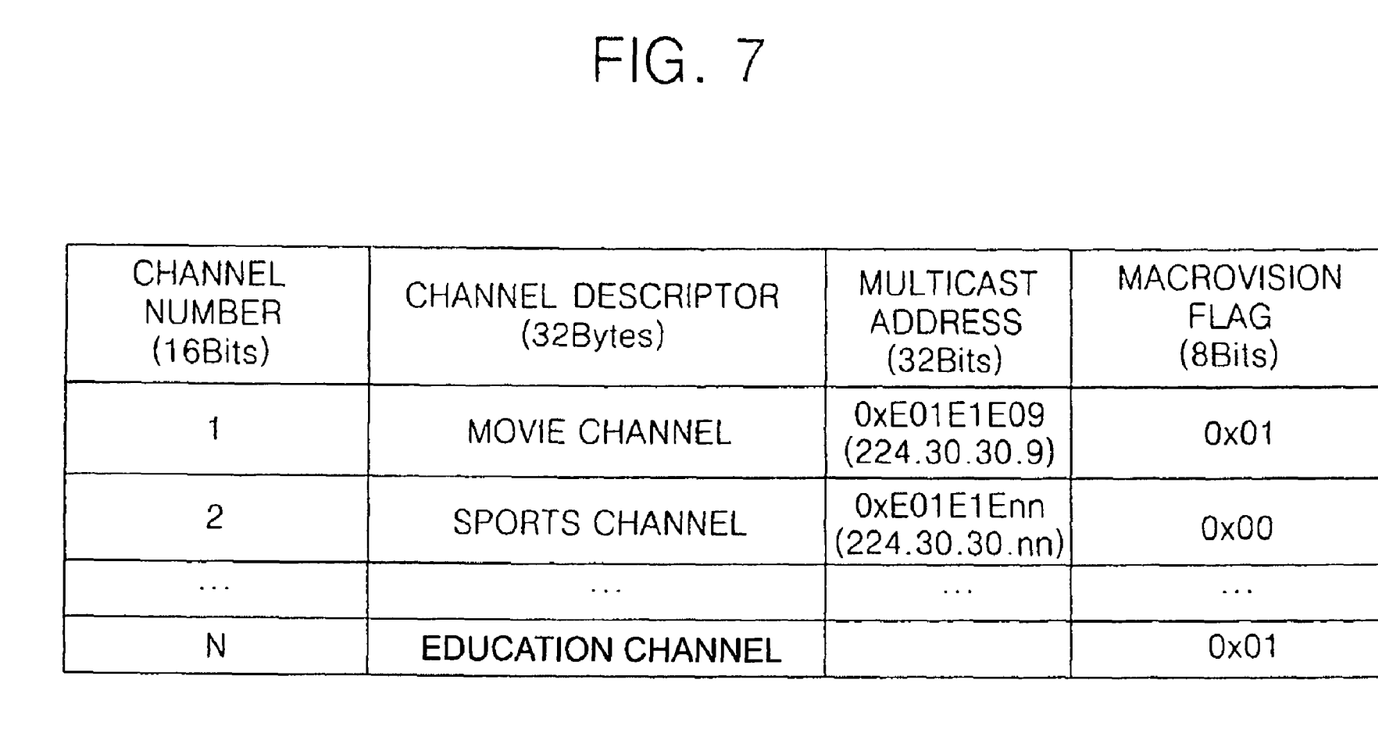
FIG. 7 is a broadcast channel information table according to an exemplary embodiment of the present invention.

An exemplary embodiment of the broadcast channel information table is shown in FIG. 7. As shown in FIG. 7, the broadcast channel information table is made up of entries showing IPTV broadcast channel numbers (Channel Number), describing IPTV broadcast channels (Channel Descriptor), representing at least one broadcast channel multicast address (Multicast Address) set up to transmit/receive the broadcast data of an IPTV broadcast channel, and indicating whether or not the broadcast data of the IPTV broadcast channel can be copied (Macrovision Flag).

Among the entries of the broadcast channel information table, the broadcast channel multicast address is expressed in hexadecimal notation. For example, the broadcast channel multicast group address "224.30.30.9" corresponding to broadcast channel number "1" is "0xE01E1E09" in hexadecimal notation.

When the entry indicating whether or not the broadcast data of the IPTV broadcast channel can be copied is set to "0x00", a receiving side can copy the broadcast data of the corresponding broadcast channel. When the entry is set to "0x01", the receiving side cannot copy the broadcast data of the corresponding broadcast channel.

For example, the broadcast data "Movie Channel" corresponding to broadcast channel number "1" cannot be copied by the receiving side because the entry indicating whether or not the broadcast data of the IPTV broadcast channel can be copied is set to "0x01".

On the other hand, the broadcast data "Sports Channel" corresponding to broadcast channel number "2" can be copied by the receiving side because the entry indicating whether or not the broadcast data of the IPTV broadcast channel can be copied is set to "0x00".

In other words, when the entry is set to "0x01", a copy guard function is active, so that the receiving side cannot copy the broadcast data. When the entry is set to "0x00", the copy guard function is inactive, so that the receiving side can copy the broadcast data.

The broadcast channel information table generator 210 transforms the generated broadcast channel information table into MPEG2 format, generates a first IP packet including the broadcast channel information table in MPEG2 TS format and the broadcast channel information multicast address, and sends the first IP packet over the Internet through the network interface 230.

The controller 220 transforms IPTV broadcast data received from at least one IPTV broadcasting station via the Internet into MPEG2 format, generates a second IP packet including the IPTV broadcast data in MPEG2 format and the broadcast channel multicast address set up to transmit/receive the corresponding IPTV broadcast data, and sends the second IP packet over the Internet through the network interface 230.

When the broadcast channel information changes, the broadcast channel information table generator 210 updates the broadcast channel information table using the changed broadcast channel information, transforms the updated broadcast channel information table into MPEG2 TS format, generates the first IP packet including the updated broadcast channel information table in MPEG2 TS format and broadcast channel information multicast address, and sends the first IP packet over the Internet through the network interface 230.

Figure 3:
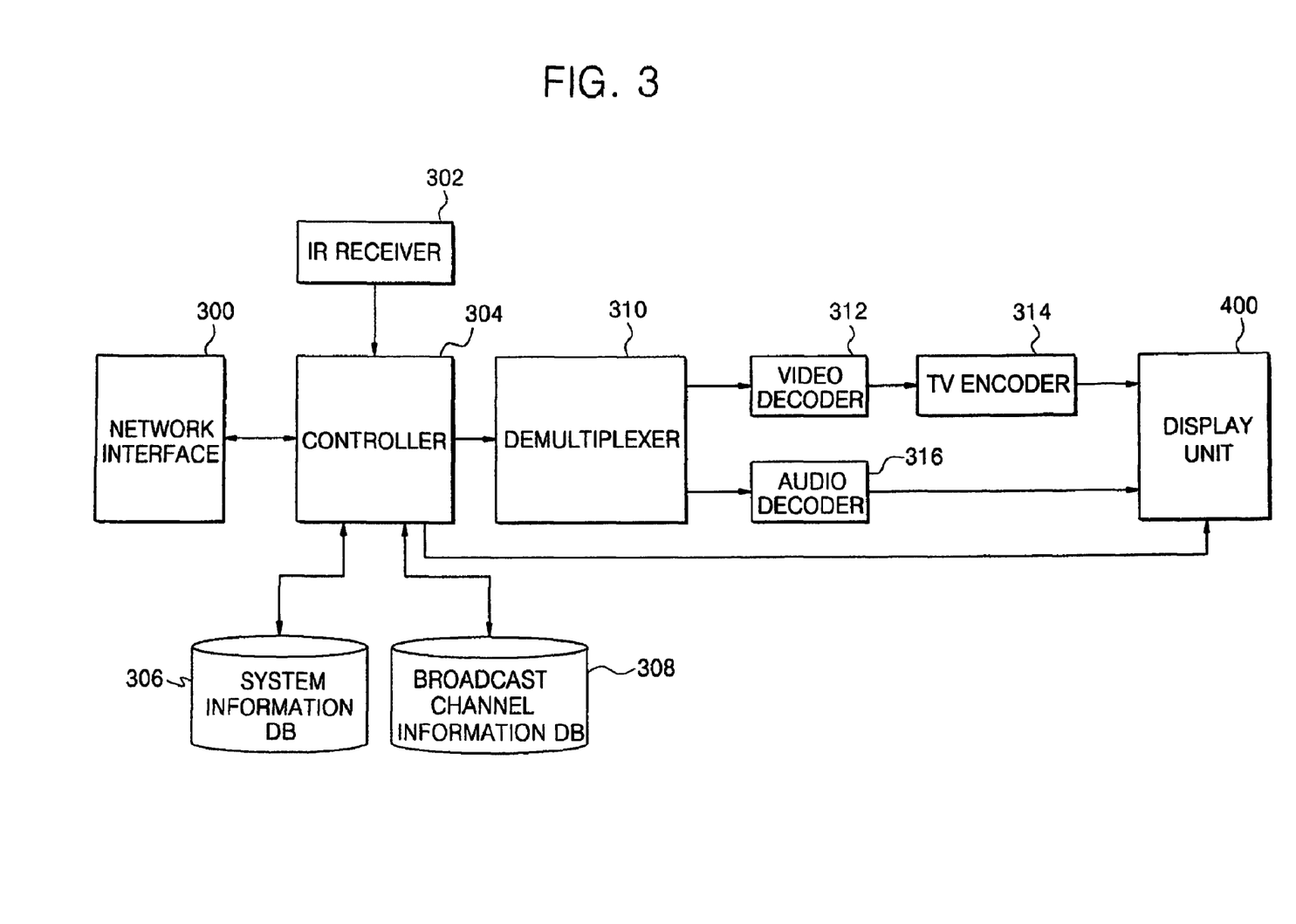
FIG. 3 is a block diagram of a set-top box of FIG. 1.

FIG. 3 is a block diagram of a set-top box of FIG. 1. As shown in FIG. 3, the set-top box includes a network interface 300, an Infrared (IR) receiver 302, a controller 304, a system information database 306, a broadcast channel information database 308, a demultiplexer 310, a video decoder 312, a TV encoder 314, and an audio decoder 316.

The system information database 306 stores broadcast channel information address information.

The controller 304 generates a second join message to join a broadcast channel information multicast group for receiving a broadcast channel information table and sends the second join message over the Internet through the network interface 300.

Subsequently, when a multicast packet including the broadcast channel information table is received via the network interface 300, the controller 304 stores the broadcast channel information table in the broadcast channel information database 308.

The broadcast channel information database 308 stores the broadcast channel information table and IPTV broadcast channels that have been watched, and is preferably made up of nonvolatile memories.

Preferably, the broadcast channel information table stored in the broadcast channel information database 308 has the format shown in FIG. 7.

The IR receiver 302 converts an IPTV broadcast access signal received from a remote control (not shown) into an electrical signal and provides it to the controller 304.

When the converted IPTV broadcast access signal is received from the IR receiver 302, the controller 304 displays the broadcast channel information table on the screen of a display unit 400.

The controller 304 joins the multicast group of a broadcast channel that is setup ahead of an access request for a broadcast channel included in the broadcast channel information table, and displays the corresponding broadcast data received from the Internet on the screen of the display unit 400.

In other words, the controller 304 generates a third join message to join the multicast group of the broadcast channel set up ahead of the access request for the broadcast channel included in the broadcast channel information table, and sends it over the Internet through the network interface 300.

The set broadcast channel can be a broadcast channel that has been received last before the IPTV broadcast access signal is received from the IR receiver 302, or the first broadcast channel of the broadcast channel information table when no broadcast channel has been received before the IPTV broadcast access signal is received from the IR receiver 302.

When the broadcast data of the set broadcast channel is received from the Internet via the network interface 300, the controller 304 provides the broadcast data of the set broadcast channel to the demultiplexer 310. The broadcast data of the set broadcast channel received from the Internet is in MPEG2 TS format.

The demultiplexer 310 divides the broadcast data in MPEG2 TS format of the set broadcast channel into MPEG video data and MPEG voice data, and provides the MPEG video data to the video decoder 312 and the MPEG voice data to the audio decoder 316.

The video decoder 312 converts the MPEG video data into a TV video signal and provides it to the TV encoder 314.

The TV encoder 314 controls an operation that copies the TV video signal to a TV video signal storage medium (not shown) according to the information included in the broadcast channel information table as to whether or not the broadcast data of the IPTV broadcast channel can be copied, and simultaneously provides the TV video signal to the display unit 400.

Specifically, when the information as to whether or not the broadcast data of the IPTV broadcast channel can be copied is set to "0x00," the TV encoder 314 does not include an analog copy protection signal for preventing recording in the TV video signal.

On the other hand, when the information as to whether or not the broadcast data of the IPTV broadcast channel can be copied is set to "0x01," the TV encoder 314 includes the analog copy protection signal in the TV video signal. Thereby, the TV video signal including the analog copy protection signal is not recorded by a video cassette recorder (VCR) or the like.

The audio decoder 316 converts the MPEG voice data of the set broadcast channel into a TV voice signal and provides it to the display unit 400.

The display unit 400 outputs the TV video signal and TV voice signal respectively provided from the TV encoder 314 and the audio decoder 316, and can be a TV, etc.

Meanwhile, when access to a broadcast channel is requested, the controller 304 joins the multicast group of the broadcast channel and displays the broadcast data of the broadcast channel received from the Internet on the screen of the display unit 400.

The process is described in detail below.

The IR receiver 302 converts an access request signal received from a remote controller for the broadcast channel in the broadcast channel information table into an electrical signal and provides it to the controller 304.

When the access request signal for the broadcast channel in the broadcast channel information table is received from the IR receiver 302, the controller 304 generates a first join message to join a multicast group set up for the broadcast channel and sends it over the Internet through the network interface 300.

When an IPTV broadcast access signal is received from the IR receiver 302, the access request signal for a broadcast channel can be received from the IR receiver 302 after the broadcast channel information table is displayed on the screen of the display unit 400, or regardless of when the broadcast channel information table is displayed on the screen of the display unit 400.

In other words, a user can select a desired broadcast channel in the broadcast channel information table displayed on the screen of the display unit 400 through the IR receiver 302, or select the desired broadcast channel through the IR receiver 302 regardless of when the broadcast channel information table is displayed on the screen of the display unit 400.

When the broadcast data of the broadcast channel is received from the Internet via the network interface 300, the controller 304 provides the broadcast data of the broadcast channel to the demultiplexer 310. Here, the broadcast data of the broadcast channel received from the Internet is in MPEG2 TS format.

The demultiplexer 310 divides the broadcast data of the broadcast channel in MPEG2 TS format into MPEG video data and MPEG voice data, and provides the MPEG video data to the video decoder 312 and the MPEG voice data to the audio decoder 316.

The video decoder 312 converts the MPEG video data into a TV video signal and provides it to the TV encoder 314.

The TV encoder 314 controls an operation that copies the TV video signal provided from the video decoder 312 to a TV video signal storage medium according to the information on whether or not the broadcast data of the IPTV broadcast channel can be copied included in the broadcast channel information table and simultaneously provides the TV video signal of the broadcast channel to the display unit 400.

Specifically, when the information on whether or not the broadcast data of the IPTV broadcast channel can be copied is set to "0x00," the TV encoder 314 does not include an analog copy protection signal for preventing recording in the TV video signal.

On the other hand, when the information on whether or not the broadcast data of the IPTV broadcast channel can be copied is set to "0x01," the TV encoder 314 includes the analog copy protection signal in the TV video signal. Thus, the TV video signal including the analog copy protection signal is not recorded by a VCR, etc.

The audio decoder 316 converts the MPEG voice data of the broadcast channel into a TV voice signal and provides it to the display unit 400.

The display unit 400 outputs the TV video signal and TV voice signal respectively provided from the TV encoder 314 and the audio decoder 316.

When a first IP packet including a changed broadcast channel information table is received from the Internet via the network interface 300, the controller 304 replaces the broadcast channel information table stored in the broadcast channel information database 308 with the changed broadcast channel information table.

Figure 4:
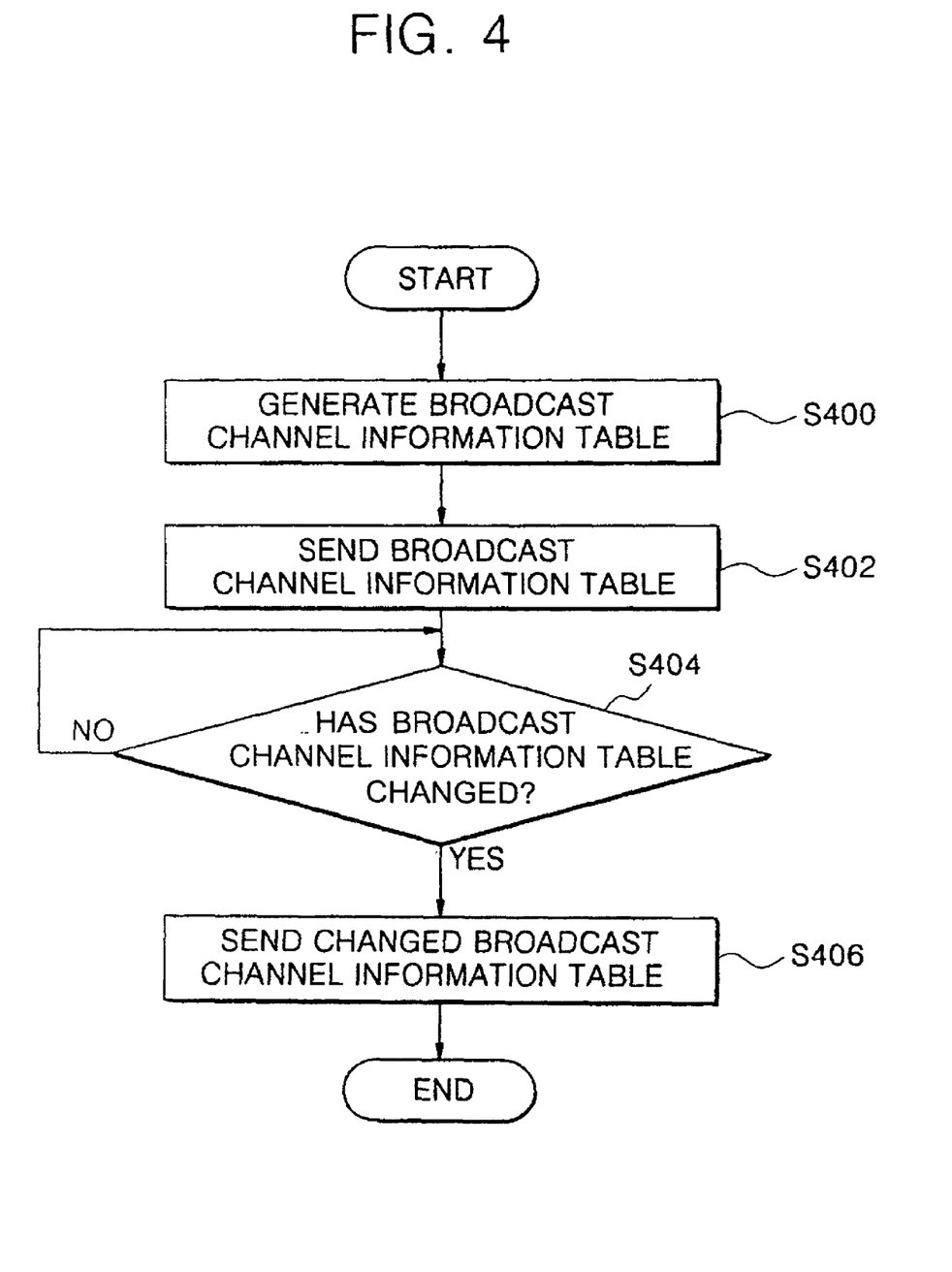
FIG. 4 is a flowchart of an IPTV broadcast channel information-providing method of a head-end according to an exemplary embodiment of the present invention.

FIG. 4 is a flowchart of an IPTV broadcast channel information-providing method of the head-end according to an exemplary embodiment of the present invention. As shown in FIG. 4, the head-end receives broadcast channel information input by Internet broadcast service providers and generates a broadcast channel information table (S400).

The broadcast channel information includes IPTV broadcast channel numbers, a description of IPTV broadcast channels, at least one broadcast channel multicast group address set up to transmit/receive broadcast data of an IPTV broadcast channel, and information as to whether or not the broadcast data of the IPTV broadcast channel can be copied.

The head-end transforms the generated broadcast channel information table into the MPEG2 TS, generates a first IP packet including the broadcast channel information table in MPEG2 TS format and a previously set broadcast channel information multicast group address, and sends the first IP packet over the Internet (S402).

Subsequently, the head-end determines if the generated broadcast channel information table has changed (S404).

When the generated broadcast channel information table has changed, the head-end transforms the changed broadcast channel information table into the MPEG2 TS format, generates the first IP packet including the changed broadcast channel information table and previously set broadcast channel information multicast group addresses, and sends the first IP packet over the Internet (S406).

Figure 5:
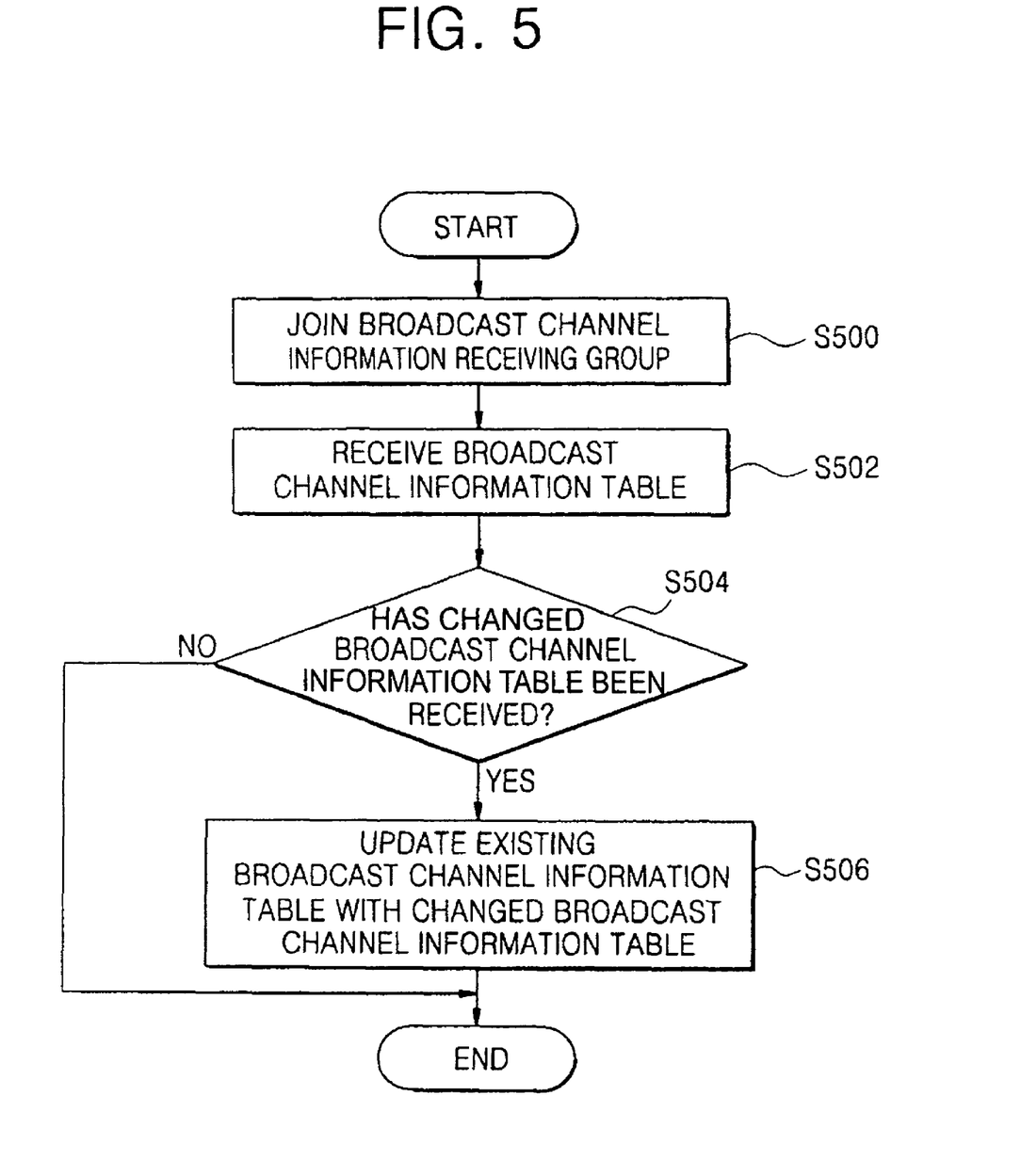
FIG. 5 is a flowchart of an IPTV broadcast channel information-providing method of a set-top box according to an exemplary embodiment of the present invention.

FIG. 5 is a flowchart of an IPTV broadcast channel information-providing method of the set-top box according to an exemplary embodiment of the present invention. As shown in FIG. 5, the set-top box generates a second join message for joining a broadcast channel information multicast group that has been previously set up to transmit/receive a broadcast channel information table, and sends it over the Internet (S500).

The broadcast channel information table is made up of the entries showing IPTV broadcast channel numbers (Channel Number), describing IPTV broadcast channels (Channel Descriptor), representing at least one broadcast channel multicast group address (Multicast Address) set up to transmit/receive the broadcast data of an IPTV broadcast channel, and indicating whether or not the broadcast data of the IPTV broadcast channel can be copied (Macrovision Flag). In addition, the broadcast channel information table can have the same format as shown in FIG. 7.

When a multicast packet including a broadcast channel information table has been received from the Internet, the set-top box stores the broadcast channel information table in the broadcast channel information database (S502). Preferably, the broadcast channel information database includes nonvolatile memories.

Subsequently, the set-top box determines if a first IP packet including a changed broadcast channel information table has been received (S504). When the first IP packet including a changed broadcast channel information table has been received from the Internet, the set-top box replaces the broadcast channel information table stored in the broadcast channel information database with the changed broadcast channel information table (S506).

Figure 6:
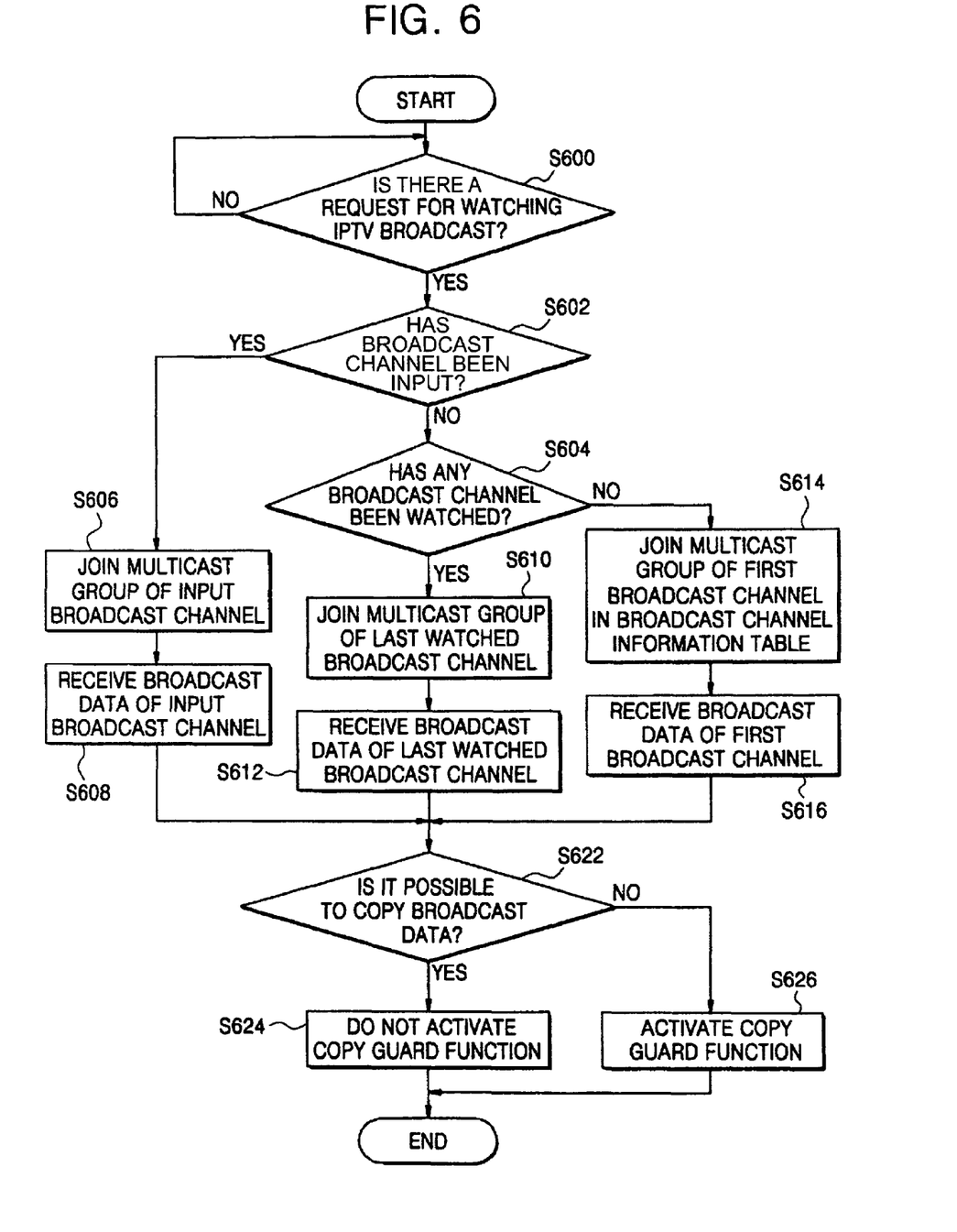
FIG. 6 is a flowchart of a broadcast data receiving method of the set-top box according to an exemplary embodiment of the present invention.

FIG. 6 is a flowchart of a broadcast data receiving method of the set-top box according to an exemplary embodiment of the present invention. As shown in FIG. 6, the set-top box determines if there is an IPTV broadcast watch request to display an IPTV broadcast (S600). The IPTV broadcast watch request can be provided by a remote control with an infrared signal and received by the IR receiver 302 of FIG. 3.

When there is an IPTV broadcast access request, the set-top box determines if a desired broadcast channel has been input (S602). The desired broadcast channel can be input by the remote control sending an infrared signal to the IR receiver 302 as shown in FIG. 3.

In addition, the broadcast channel can be input after the broadcast channel information table is displayed on the TV screen according to the IPTV broadcast access request, or can be directly input regardless of when the broadcast channel information table is displayed on the TV screen.

When the desired broadcast channel has been input, the set-top box extracts the multicast address of the desired broadcast channel from the broadcast channel information table, causes the extracted multicast address for joining a multicast group set up for the corresponding broadcast channel to be included in a first join message, and sends it over the Internet (S606).

Subsequently, when the broadcast data of the desired broadcast channel has been received from the Internet, the set-top box displays the broadcast data of the desired broadcast channel on the screen of the display unit connected thereto (S608). The broadcast data of the broadcast channel received from the Internet can have the MPEG2 TS format.

When a desired broadcast channel has not been input in step S602, the set-top box determines if any broadcast channel has been watched ahead of the IPTV broadcast access request (S604).

When a broadcast channel has been watched ahead of the IPTV broadcast access request, the set-top box generates a third join message to join a multicast group set up for the last watched broadcast channel and sends it over the Internet (S610).

When the broadcast data of the last watched broadcast channel has been received from the Internet, the set-top box displays the broadcast data on the screen of the display unit connected thereto (S612).

When no broadcast channel has been watched ahead of the IPTV broadcast access request, as determined in step 604, the set-top box generates a fourth join message to join a multicast group for the first broadcast channel of the broadcast channel information table and sends it over the Internet (S614).

When the broadcast data of the first broadcast channel of the broadcast channel information table has been received from the Internet, the set-top box displays the broadcast data of the corresponding broadcast channel on the screen of the display unit connected thereto (S616).

The set-top box determines if the broadcast data of a broadcast channel received from the Internet can be copied to a storage medium using information included in the broadcast channel information table as to whether or not the broadcast data can be copied (S622).

When the information as to whether or not the broadcast data can be copied indicates that the broadcast data can be copied, the set-top box does not activate a copy guard function and thus allows the broadcast data received from the Internet to be stored in the storage medium (S624).

On the other hand, when the information as to whether or not the broadcast data can be copied indicates that the broadcast data cannot be copied, the set-top box activates the copy guard function and thus does not allow the broadcast data received from the Internet to be stored in the storage medium (S626).

As described above, according to the system and method for providing broadcast channel information according to the present invention, a broadcast channel information table and a broadcast channel information multicast address set up to transmit/receive the broadcast channel information table are included in an IP packet, the IP packet is sent to a network, a set-top box is commanded to join a multicast group set up to transmit/receive the broadcast channel information table, and the broadcast channel information table sent from the network is stored. Therefore, there is no need to receive broadcast channel information every time the set-top box is turned on or off.

While the present invention has been described with reference to exemplary embodiments thereof, it will be understood by those skilled in the art that various modifications in form and detail can be made therein without departing from the scope of the present invention as defined by the following claims.

What is claimed is:

1. A system of providing broadcast channel information, comprising:
    a broadcast channel information-providing server comprising a broadcast channel information table and a broadcast channel information multicast address in a first Internet Protocol (IP) packet, the broadcast channel information-providing server to send the first IP packet to a network, the broadcast channel information multicast address being the address of a set-top box arranged to receive the broadcast channel information table; and
    a set-top box to generate a first join message to join a broadcast channel information multicast group, to send the first join message to the network, to store the broadcast channel information table received from the network, to generate a second join message to join a multicast group for transmitting/receiving broadcast data of a broadcast channel included in the broadcast channel information table according to an access request for the broadcast channel, to send the second join message to the network, and to output the broadcast data of the broadcast channel received from the network, wherein the broadcast channel information table comprises entries indicating broadcast channel numbers, describing broadcast channels, representing broadcast channel multicast addresses arranged to transmit/receive broadcast data of broadcast channels, and indicating whether or not broadcast data of the broadcast channels can be copied, and wherein the set-top box comprises:

a database to store the broadcast channel information multicast address and the broadcast channel information table;

a broadcast channel information table receiver to generate the first join message to join the broadcast channel information multicast group, to send the first loin message to the network, to receive the broadcast channel information table and a changed broadcast channel information table from the network, and to store the broadcast channel information table and the changed broadcast channel information table in the database; and a broadcast data receiver to generate the second join message to join the multicast group for transmitting/receiving the broadcast data of the broadcast channel according to the access request for the broadcast channel, to send the second join message to the network, to output the broadcast data of the broadcast channel received from the network, and to regulate copying of the broadcast data of the broadcast channel according to an entry in the broadcast channel information table as to whether or not the broadcast data of the broadcast channel can be copied comprised in the broadcast channel information table.

2. The broadcast channel information-providing system of claim 1, further comprising:

at least one network switch arranged in the network, the at least one network switch to add the set-top box to a list of members joining the broadcast channel information multicast group using an Internet Group Management Protocol (IGMP) according to the first join message sent from the set-top box, to include the broadcast channel information table received from the broadcast channel information-providing server in a second IP packet, and to multicast the second IP packet to the members of the list.

3. The broadcast channel information-providing system of claim 1, wherein the broadcast channel information-providing server comprises:

a table generator to generate the broadcast channel information table using information of at least one input broadcast channel, to include the generated broadcast channel information table and the broadcast channel information multicast address arranged to transmit/receive the broadcast channel information table in the first IP packet and to send the first IP packet to the network, to include, upon the broadcast channel information table changing, the changed broadcast channel information table and the broadcast channel information multicast address in the first IP packet, and to send the first IP packet to the network; and a broadcast data provider to include broadcast data and a multicast address in a third IP packet and to send the third IP packet to the network, the broadcast data being received from at least one broadcasting station via the network and the multicast address being arranged to multicast the corresponding broadcast data.

4. The broadcast channel information-providing system of claim 3, wherein the information of at least one input broadcast channel comprises at least one of broadcast channel number data, broadcast channel description data, broadcast channel multicast address data arranged to transmit/receive broadcast data of the broadcast channel, and data as to whether or not the broadcast data of the broadcast channel can be copied.

5. The broadcast channel information-providing system of claim 1, wherein the broadcast data receiver is configured to generate a third join message to join a multicast group for transmitting/receiving broadcast data of a broadcast channel arranged ahead of the access request for the broadcast channel, to send the third join message to the network, to receive the broadcast data of the set broadcast channel from the network, to output the broadcast data, and to regulate copying of the broadcast data of the set broadcast channel according to the entry indicating whether or not the broadcast data of the set broadcast channel can be copied comprised in the broadcast channel information table.

6. A method of providing broadcast channel information in a broadcast network comprising a broadcast channel information-providing server and at least one set-top box, the method comprising:

including a broadcast channel information table and a broadcast channel information multicast address of a set-top box arranged to receive the broadcast channel information table in a first Internet Protocol (IP) packet in the broadcast channel information-providing server, and sending the first IP packet to a network with the broadcast channel information-providing server;

generating a first join message to join a broadcast channel information multicast group, sending the first join message to the network, and storing the broadcast channel information table received from the network with the at least one set-top box; and generating a second join message to join a multicast group for transmitting/receiving broadcast data of a desired broadcast channel according to an access request for the desired broadcast channel included in the broadcast channel information table, sending the second join message to the network, and outputting the broadcast data of the desired broadcast channel received from the network with the at least one set-top box, wherein the broadcast channel information table comprises entries indicating broadcast channel numbers, describing broadcast channels, representing broadcast channel multicast addresses arranged to transmit/receive broadcast data of broadcast channels, and indicating whether or not broadcast data of the broadcast channels can be copied, and wherein the at least one set-top box performs:

generating a third loin message to loin a multicast group for transmitting/receiving broadcast data of a broadcast channel arranged ahead of the access request for the desired broadcast channel, and sending the third loin message to the network; and receiving the broadcast data of the set broadcast channel from the network, outputting the broadcast data, and regulating copying of the broadcast data of the set broadcast channel according to the information in the broadcast channel information table as to whether or not the broadcast data of the set broadcast channel can be copied comprised in the broadcast channel information table.

7. The method of claim 6, wherein including a broadcast channel information table and a broadcast channel information multicast address of a set-top box arranged to transmit/ receive the broadcast channel information table in a first Internet Protocol (IP) packet in the broadcast channel information-providing server, and sending the first IP packet to a network comprises:

generating the broadcast channel information table using information of at least one input broadcast channel, including the generated broadcast channel information table and the broadcast channel information multicast address in the first IP packet, and sending the first IP packet to the network;

including a changed broadcast channel information table and the broadcast channel information multicast address in the first IP packet and sending the first IP packet to the network in response to the broadcast channel information table changing; and including broadcast data and a multicast address in a second IP packet, and sending the second IP packet to the network, the broadcast data being received from at least one broadcasting station via the network, and the multicast address being arranged to multicast the corresponding broadcast data.

8. The method of claim 7, wherein the information of at least one input broadcast channel comprises at least one of broadcast channel number data, broadcast channel description data, broadcast channel multicast address data arranged to transmit/receive broadcast data of broadcast channels, and data as to whether or not the broadcast data of broadcast channels can be copied.

9. The method of claim 6, wherein generating a second join message to join a multicast group for transmitting/receiving broadcast data of a desired broadcast channel according to an access request for the desired broadcast channel included in the broadcast channel information table, sending the second join message to the network, and outputting the broadcast data of the desired broadcast channel received from the network comprises:

regulating copying of the broadcast data of the desired broadcast channel according to the information in the broadcast channel information table as to whether or not the broadcast data of the desired broadcast channel can be copied.

* * * * *